United States Patent
Barrett et al.

[11] Patent Number: 6,167,280
[45] Date of Patent: *Dec. 26, 2000

[54] METHOD AND SYSTEM FOR INITIATING A DATA TRANSFER IN A CELLULAR COMMUNICATIONS SYSTEM

[75] Inventors: Steven Tanabe Barrett, Grapevine; Timothy James Muths, Keller, both of Tex.

[73] Assignee: Motorola, Inc., Schaumburg, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/865,665

[22] Filed: May 30, 1997

[51] Int. Cl.[7] .......................................... H04Q 7/20

[52] U.S. Cl. .......................... 455/466; 455/557; 379/220; 375/222

[58] Field of Search ..................................... 455/432, 433, 455/435, 456, 466, 557, 450; 379/220, 93.01, 93.05, 93.31, 93.34; 375/222

[56] References Cited

U.S. PATENT DOCUMENTS

| 5,504,939 | 4/1996 | Mayrand et al. | 455/450 |
| 5,521,972 | 5/1996 | Iki | 379/220 |
| 5,724,509 | 3/1998 | Starkweather et al. | 395/200.5 |
| 5,768,267 | 6/1998 | Raith et al. | 455/435 |

*Primary Examiner*—Reinhard J. Eisenzopf
*Assistant Examiner*—Sam Bhattacharya
*Attorney, Agent, or Firm*—L. Bruce Terry

[57] ABSTRACT

In a wireless telecommunications system (40), a subscriber unit (44) transmits a request for a data connection (10) to cellular infrastructure equipment (46), wherein the data connection is between the requesting subscriber unit (42) and a data receiver (80,82) coupled to the cellular infrastructure equipment (46) via a public switched telephone network (68). In response to the transmitted request (10), data connection configuration parameters (78) stored in the cellular infrastructure (46) are selected (90), and the data connection is configured (208) according to the selected data configuration parameters. Data connection configuration parameters may include AT commands from the AT command set.

16 Claims, 4 Drawing Sheets

METHOD AND SYSTEM FOR INITIATING A DATA TRANSFER IN A CELLULAR COMMUNICATIONS SYSTEM

FIELD OF THE INVENTION

The present invention is related in general to wireless communication systems, and more particularly to an improved method and system for initiating a data transfer from a subscriber unit in a cellular communications system.

BACKGROUND OF THE INVENTION

In a cellular communications system, subscribers or users may want to transfer digital information over the air using their subscriber unit. To facilitate this wireless transfer of digital information, many subscriber units offer optional connections for receiving digital information from a computer, a facsimile machine, or other data source.

The advance of digital cellular communications systems allows new possibilities for data transmissions. Instead of converting digital bits (pulses) into audio signals that are sent on the radio channel, the digital bits are sent directly into the phase modulator of the digital transmitter in the subscriber unit. This approach allows much higher data transmission rates. When the digital bits are received in the cellular infrastructure, they must be converted to a format that can be transmitted through the public switched telephone network.

With reference now to the data flow diagram in FIG. 1, call setup procedures for code division multiple access (CDMA) circuit data and fax services involves several data and command transfers between a subscriber unit, a radio subsystem, and an interworking unit that contains one or more modems. The subscriber unit is the unit on the user's side of the radio frequency interface. The radio subsystem and the interworking unit are each a part of what may be referred to as cellular infrastructure, which is on the other side of the radio frequency interface. The cellular infrastructure may be defined as the equipment and software that couples the subscriber to the public switched telephone network. As shown in FIG. 1, the subscriber unit sends a request for a data connection 10 to the radio subsystem, or base station. The radio subsystem then requests a data circuit 12 in the interworking unit. This request may be implemented in a CDMA system by using ANSI T1.617 protocol. The interworking unit responds with an ANSI (American National Standards Institute) T1.617 connection acknowledgment response 14. ANSI T1.617 is a call processing protocol to setup and tear down a data circuit between the radio subsystem and the interworking unit in a cellular communication system.

Next, the subscriber unit and the interworking unit exchange commands and data to setup a data communication protocol stack 16, such as an IS-99 stack in a CDMA system. After the data protocol stack is setup, the subscriber unit and the interworking unit exchange AT commands and responses 18 in order to configure the modem according to the user's need. As shown in FIG. 1, several commands and responses 18 may be necessary to properly configure the modem and the data connection. Such AT commands may include commands to instruct the modem to communicate at a specified baud rate, to change the carrier detect timeout, or to perform any other similar command from the extensive list of AT commands.

After the modem is configured, the interworking unit requests a PSTN data circuit 20. This step may be accomplished by using ANSI T1.607 protocol in a CDMA communications system.

To indicate that the PSTN connection 22 has been established, the radio subsystem sends the interworking unit a connection acknowledgment signal 24, which in a CDMA system uses ANSI T1.607. Thereafter, the radio subsystem performs modem negotiation 26, which is a process that prepares the modems to communicate with each other.

After modem negotiation 26, the modem in the interworking unit responds to the subscriber unit with a connect indication. Thereafter, data transfer 30 between the subscriber unit and the modem may proceed.

As shown in FIG. 1, the prior art method of initiating a data transfer requires that AT commands 18 or other similar configuration commands be sent from the subscriber unit to the modem in the interworking unit. These commands are sent over the air interface and use billable air time during the transfer. Such billable air time increases the cost of data transfer from a subscriber unit to a data receiver. Furthermore, while the subscriber laboriously enters commands to configure the data connection, other users may be blocked from access to the cellular system. Such blocking may be reduced if time required to setup the data connection is reduced.

Therefore, a need exists for an improved method and system for initiating a data transfer wherein the air time required to configure the data connection is reduced or eliminated.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF THE INVENTION

Figure 2:
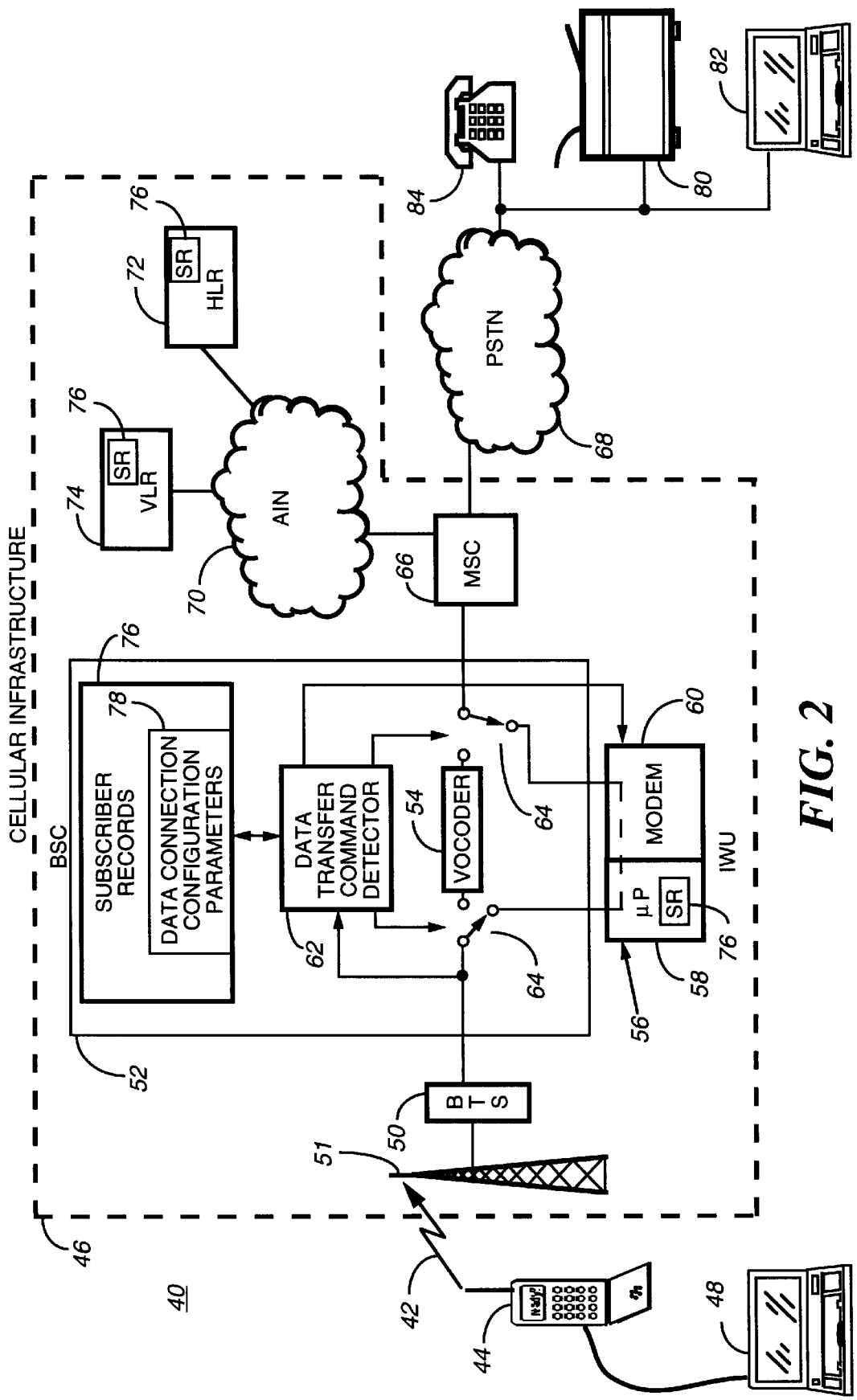
FIG. 2 is a high-level block diagram of a cellular communications system in accordance with the method and system of the present invention.

With reference now to the figures, and in particular with reference to FIG. 2, there is depicted a block diagram of cellular communications system 40. At a high level of abstraction, cellular communications system 40 may be divided at air interface 42 into 2 components; subscriber unit 44 and cellular infrastructure 46.

As shown, subscriber unit 44 may be coupled to a data source, such as computer 48. Data generated by computer 48 may include word processing documents, databases, graphic documents, image files, files containing video information, or facsimile data. Data sources other than computer 48 may include a facsimile machine, a personal digital assistant, or other similar devices.

Subscriber unit 44 communicates with cellular infrastructure 46 via air interface 42. Air interface 42 is typically a radio frequency communication channel, such as the radio frequency communication channels used by analog and digital cellular communication systems. Examples of such air interfaces are described in standards promulgated by the Electronics Industries Association (EIA) and the Telecommunications Industry Association (TIA), examples of which include advanced mobile phone service (AMPS) defined by specification EIA-553, time division multiple access (TDMA) service described in interim standard 54 (IS-54), and code division multiple access (CDMA) service described in standard IS-95.

Radio frequency signals sent from subscriber unit 44 are received by cellular infrastructure 46 at base transceiver station (BTS) 50. BTS 50 is conventionally located near an antenna 51 for the cell in cellular communications system 40.

BSC 52 provides an interface between signals from BTS 50 and signals that may be interfaced to the public switched telephone network (PSTN) 68. Several BTS's 50 may be coupled to base station controller (BSC) 52. For example, in a CDMA communication system, BSC 52 converts voice data from BTS 50 into pulse code modulation (PCM) data with vocoder 54. If a subscriber data signal is received at BTS 50, BSC 52 routes such a data signal to interworking unit 56, where the data is translated into a format suitable for the PSTN.

Interworking unit 56 typically includes a microprocessor or computer 58 and one or more modems 60.

The path of data from BTS 50 through BSC 52 is controlled by data transfer command detector 62, as shown schematically by switches 64. Data transfer command detector 62 may examine a service option code sent from subscriber 44 in order to route the data through vocoder 54 or interworking unit 56. Such a service option code is transmitted during the subscriber call origination messaging.

Base station controller 52 is coupled to mobile switching center 66, which performs the function of connecting communications channels from base station controller 52 with selected telephone lines from PSTN 68 or network connections in advanced intelligent network 70. The communication between mobile switching center 66 and advanced intelligent network 70 may be defined according to specification IS-41.

Advanced intelligent network 70 may also be connected to home location register (HLR) 72 and visitor location register (VLR) 74. Both HLR 72 and VLR 74 may store subscriber records 76. Subscriber records may also be stored within base station controller 52 and computer 58. Such subscriber records 76 may include subscriber preferences, registration and user profile information, and other information associated with the subscriber. Examples of subscriber preferences may include whether or not certain features or services have been enabled for the subscriber, unique subscriber identifiers, and other such preferences. Examples of data associated with the subscriber includes the subscriber's account number, the subscriber's mobile identification number, and the electronic serial number of the subscriber's equipment.

And according to an important aspect of the present invention, subscriber record 76 also includes data connection configuration parameters 78 for configuring a data connection in response to request for a data connection from the subscriber unit. Although only shown in BSC 52, subscriber records 76 containing data connection configuration parameters may also be stored wherever subscriber records 76 are stored, such as computer 58, HLR 72 or VLR 74.

PSTN 68 may be used to establish a data connection or a voice connection between cellular infrastructure 46 and facsimile machine 80, computer 82, or telephone 84.

Figure 3:
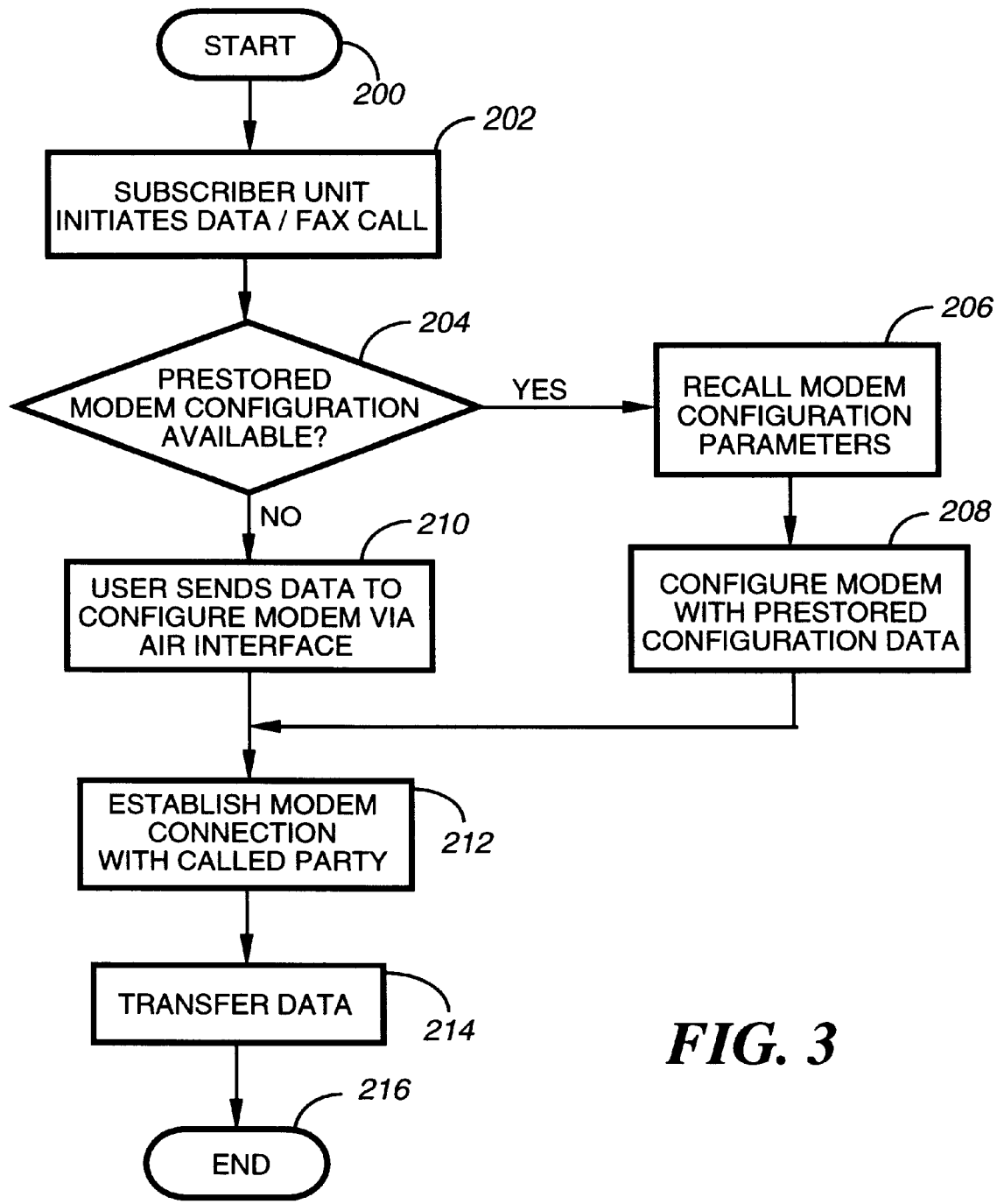
FIG. 3 is a high-level logic flowchart which illustrates the initiation of a data transfer in accordance with the method and system of the present invention.

With reference now to FIG. 3, there is depicted a high-level flowchart that illustrates the process of initiating a data transfer with a subscriber unit in a cellular communications system in accordance with the method and system of the present invention. As illustrated, the process begins at block 200 and thereafter passes to block 202 wherein the subscriber unit initiates a facsimile (fax) or data call. This step may be implemented by sending an "ATD" command.

Next, the process determines whether or not prestored data connection configuration parameters, or modem configuration parameters, are available within the cellular infrastructure, as illustrated at block 204. Such data connection configuration parameters may include commands from the AT Command Set, which is also known as the Hayes Standard AT Command Set. The AT command set was developed in 1981 by Hayes Microcomputer Products, Inc. in Norcross, Ga. This AT command set has also been extended to include additional commands as described in standard IS-99. The purpose of these commands is to set specific control variables in the modem, such as modem 60 in FIG. 2. Thus, AT commands are commands that the modem can understand and respond to. AT commands are represented by data sent to the modem that the modem itself responds to; the modem does not transmit data that represents these commands.

If the process determines that prestored data connection configuration parameters are available, the process recalls the data connection configuration parameters, or modem configuration parameters, as depicted at block 206. Such configuration parameters may be stored in base station controller 52, computer 58, HLR 72, VLR 74, or any other convenient location within cellular infrastructure 46 (See FIG. 2).

The configuration parameters may also be selected in different modes according to different criteria. For example, a default set of configuration parameters may be used by a particular subscriber if no other set is specified. In another mode of selection, the user may specify one of a group of configuration parameters. In yet another mode, the configuration parameters may be selected based upon the identity of the called party.

Once the configuration parameters have been recalled, the process configures the data connection according to the selected data connection configuration parameters, as illustrated at block 208. As shown in the example depicted in FIG. 3, this may involve configuring modem 60 with the prestored configuration data stored in subscriber records 76 (See FIG. 2). To configure the modem, the process may send AT commands to the modem.

Referring again to block 204, if the prestored data connection configuration parameters are not available, the user located at the subscriber unit may send data to configure the modem via the air interface, as depicted at block 210. Thus, if configuration parameters are not available in cellular infrastructure 46, a user may enter data connection configuration parameters into computer 48 coupled to subscriber unit 44, and such commands will be transmitted via air interface 42. If the user sends the configuration commands, the user ordinarily pays for the air time necessary to transfer the commands from subscriber unit 44 to BTS 50. This additional air time may increase the cost of transferring data from the subscriber unit. And, if the subscriber must laboriously enter the data connection configuration parameters by hand typing, the times and costs of a data transfer may increase substantially. Moreover, hand typing increases the possibility of entering an erroneous command.

After the data connection has been configured according to the selected data connection configuration parameters, the process establishes a data connection or a modem connection with the called party, as depicted at block 212. This step may be implemented by completing the data connection through the PSTN.

The blocks in FIG. 3 described above describe a process for initiating a data transfer in accordance with the method and system of the present invention. After this initiation process has been completed, data is transferred between the subscriber unit and the called party, as illustrated at block 214. Such a data transfer may include data that represents a facsimile transmission, a file transfer, a web browsing session, an e-mail retrieval, or the like.

After transferring the data, the process is terminated as indicated at block 216.

In order to store the data connection configuration parameters in the cellular infrastructure, cellular communication providers may offer web pages or computer bulletin boards for users to enter their desired data connection configuration parameters. Such a web page might include a list of parameters and features that are configurable in the interworking unit used by the cellular service provider.

Figure 1:
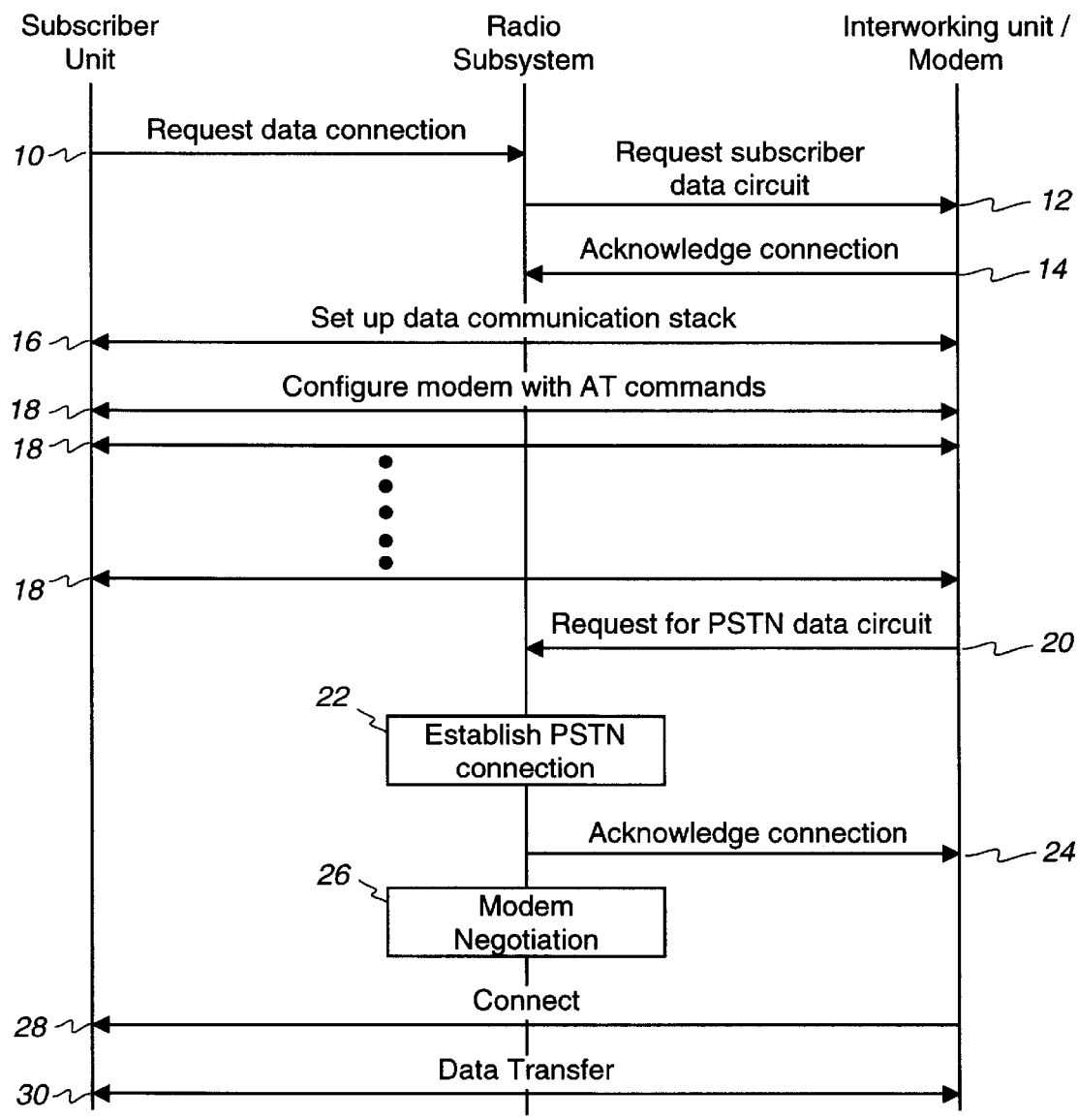
FIG. 1 is a data flow diagram that depicts communication between portions of a cellular communications system according to a prior art method and system for initiating a data transfer.
Figure 4:
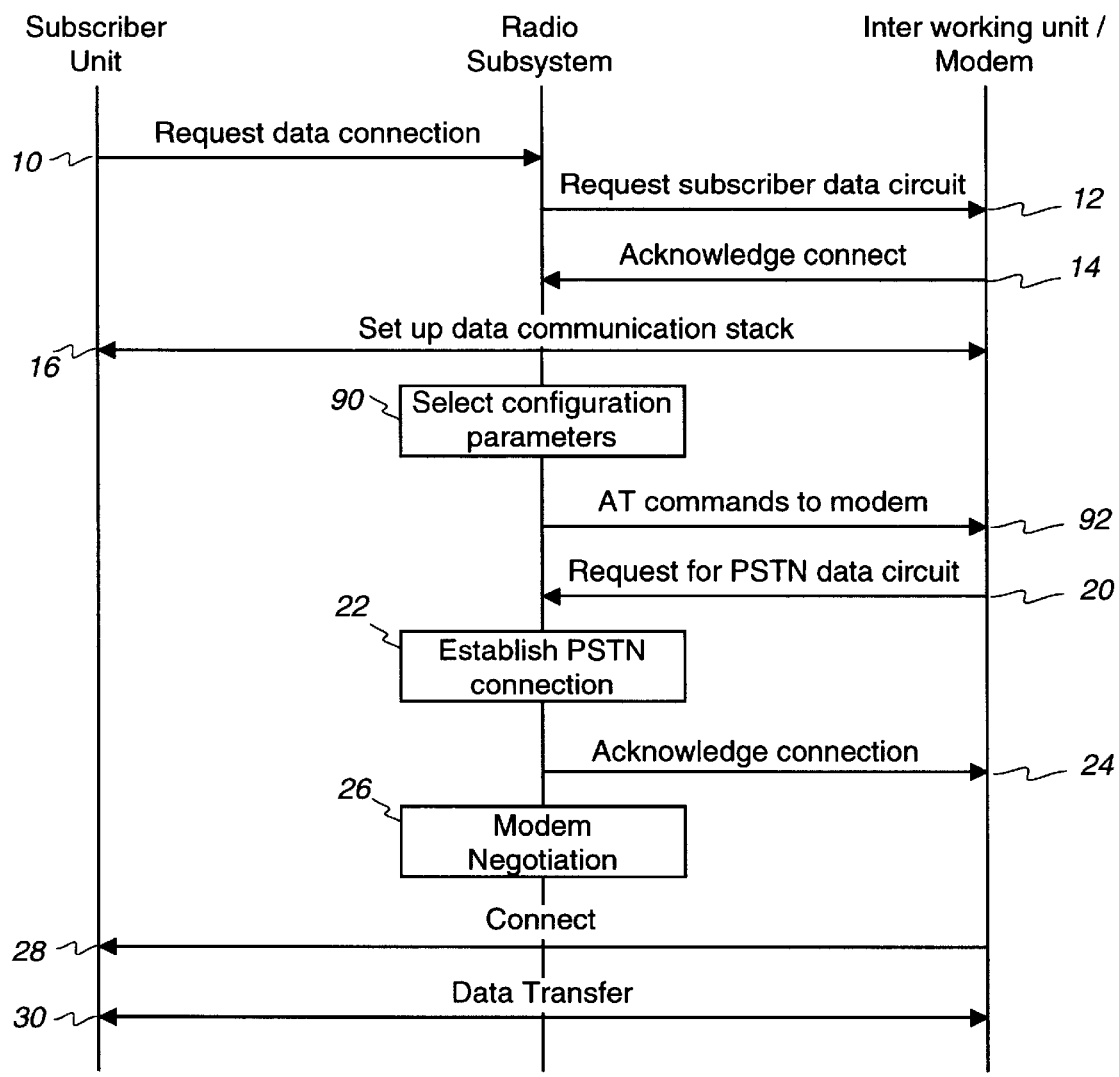
FIG. 4 is a data flow diagram that illustrates communication between portions of a cellular communications system to initiate a data transfer in accordance with the method and system of the present invention.

With reference now to FIG. 4, the call setup process depicted at request data connection 10, request subscriber data circuit 12, acknowledge connection 14, and setup data communication stacks 16 are the same communications as those described in reference to FIG. 1. According to an important aspect of the present invention, data connection configuration parameters are selected 90 in the cellular infrastructure, which includes the radio subsystem, and issued to the interworking unit/modem as shown at reference numeral 92. As may be seen in FIG. 4, such data connection configuration parameters are not transmitted over the air interface from the subscriber unit to the radio subsystem; rather they are selected and recalled from storage within cellular infrastructure 46. By avoiding the transmission of data connection configuration parameters over the air interface, the time to initiate a data call from a subscriber unit to a called party may be substantially reduced, thereby reducing the overall time required to transfer data. This reduction in data call initiation time reduces the cost of the data transfer for the subscriber, and may reduce blocking for the cellular communication provider.

Data communications between the subscriber unit, the radio subsystem, and the interworking unit/modem shown at reference numerals 20–30 remain the same as described above in reference to FIG. 1.

The foregoing description of a preferred embodiment of the invention has been presented for the purpose of illustration and description. It is not intended to be exhaustive or to limit the invention to the precise form disclosed. Modifications or variations are possible in light of the above teachings. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

We claim:

1. A method in a wireless telecommunications system for initiating a data transfer, wherein the wireless telecommunications system includes a subscriber unit and cellular infrastructure for coupling the subscriber unit to a data receiver, the method comprising the steps of:

transmitting a request for a data connection from a requesting subscriber unit to the cellular infrastructure, the data connection being between the requesting subscriber unit and the data receiver;

in response to the transmitted request, selecting data connection configuration parameters stored in the cellular infrastructure, wherein the selected data connection configuration parameters are associated with the request for a data connection; and configuring the data connection according to the selected data connection configuration parameters.

2. The method for initiating a data transfer according to claim 1 wherein the step of configuring the data connection further includes configuring a modem.

3. The method for initiating a data transfer according to claim 2 wherein the step of configuring a modem further includes configuring a facsimile modem.

4. The method for initiating a data transfer according to claim 1 wherein the step of configuring the data connection according to the data connection configuration parameters further includes configuring the data connection in response to selected AT commands from the AT command set.

5. The method for initiating a data transfer according to claim 1 wherein the step of selecting data connection configuration parameters stored in the cellular infrastructure further includes selecting data connection configuration parameters stored in an interworking unit in the cellular infrastructure.

6. The method for initiating a data transfer according to claim 1 wherein the step of transmitting a request for a data connection further includes transmitting a request for a data connection that includes a configuration identifier that identifies a set of data connection configuration parameters, and wherein the step of selecting data connection configuration parameters further includes selecting the identified set of data connection configuration parameters stored in the cellular infrastructure.

7. The method for initiating a data transfer according to claim 1 wherein the step of selecting data connection configuration parameters further includes selecting data connection configuration parameters stored in the cellular infrastructure in response to the data receiver.

8. The method for initiating a data transfer according to claim 1 wherein the step of selecting data connection configuration parameters further includes selecting data connection configuration parameters stored in the cellular infrastructure in response to identifying data connection configuration parameters associated with the requesting subscriber unit.

9. A system in a cellular communications system for initiating a data transfer from a subscriber unit to a data receiver comprising:

a configuration parameter storage unit for storing configuration parameters;

a data transfer request detector coupled to the configuration parameter storage unit for detecting a request for data transfer from the subscriber and selecting particular ones of the configuration parameters associated with the request for data transfer; and a configurable modem coupled to the data transfer request detector for receiving the particular ones of the configuration parameters in response to the request for data transfer.

10. The system for initiating a data transfer from a subscriber unit to a data receiver according to claim 9 wherein the configuration parameter storage unit for storing configuration parameters further includes a configuration parameter storage unit for storing commands from the AT command set.

11. The system for initiating a data transfer from a subscriber unit to a data receiver according to claim 9 wherein the data transfer request detector further includes a data transfer request detector for selecting particular ones of the configuration parameters based upon an association with the subscriber unit.

12. The system for initiating a data transfer from a subscriber unit to a data receiver according to claim 9 wherein the data transfer request detector further includes a data transfer request detector for selecting particular ones of the configuration parameters based upon an association with the data receiver.

13. The system for initiating a data transfer from a subscriber unit to a data receiver according to claim 9 wherein the configurable modem further includes a configurable facsimile modem.

14. The system for initiating a data transfer from a subscriber unit to a data receiver according to claim 9 wherein the data transfer request detector is coupled to the configuration parameter storage unit via a data communication channel.

15. The system for initiating a data transfer from a subscriber unit to a data receiver according to claim 9 wherein the data transfer request detector is coupled to the configuration parameter storage unit via a network communication channel.

16. The system for initiating a data transfer from a subscriber unit to a data receiver according to claim 9 wherein the configurable modem is coupled to the data storage unit via a data communication channel.

* * * * *